I. D. LOUNSBURY.
FASTENING DEVICE.
APPLICATION FILED MAR. 17, 1913.
1,121,641.
Patented Dec. 22, 1914.
Fig. 1
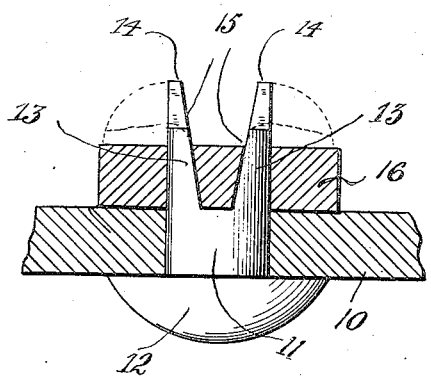
Fig. 3
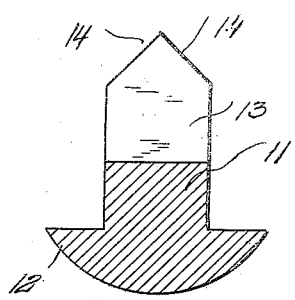
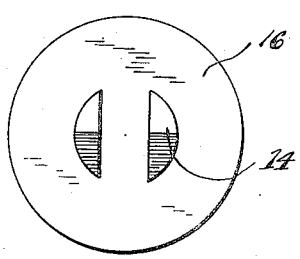
Fig. 2
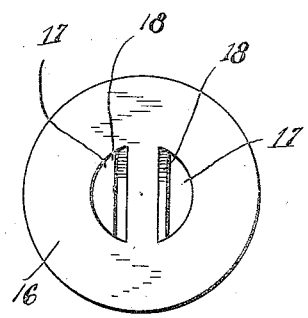
Fig. 4
Fig. 5
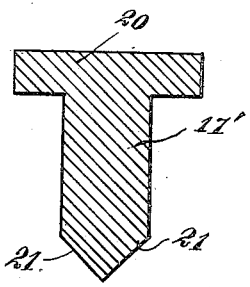
WITNESSES
INVENTOR
Ives D. Lounsbury,
his Attorney

UNITED STATES PATENT OFFICE.

IVES D. LOUNSBURY, OF BETHANY, CONNECTICUT.

FASTENING DEVICE.

1,121,641. Specification of Letters Patent. Patented Dec. 22, 1914.

Application filed March 17, 1913. Serial No. 754,880.

*To all whom it may concern:*

Be it known that I, IVES D. LOUNSBURY, a citizen of the United States, residing at Bethany, in the county of New Haven and State of Connecticut, have invented certain new and useful Improvements in Fastening Devices, of which the following is a specification.

My present invention relates to fastening devices and more specifically includes rivet means for mending the bottom of pots and pans.

The prime object of my invention is to provide means including a solder element designed primarily for use in mending the bottom of pots and pans and the like utensils such as will assure the complete and efficient mending of the hole and of such nature whereby the pan bottom is not bent or disfigured in any manner due to the clenching of the securing element.

Another object of my invention is to provide in conjunction with the rivet, means for effecting the clenching of the securing member and allowing the same to assume a position which will not materially affect the free movement of articles within the pan.

A further object of this device is to provide means whereby the bottom of pans and the like utensils can be mended very quickly and easily, in order that it may retain its normal degree of durability.

A still further object of the device is to provide a combination of elements which may be constructed easily and cheaply consequently reducing the cost of manufacture of the device to a material extent.

With the above and other objects in view, my invention relates to such detail of construction, combination and arrangement of parts as will be hereinafter more fully described and specifically pointed out in the appended claims.

In describing my invention in detail reference will be had to the accompanying drawings wherein like characters denote like or corresponding parts throughout the several views and in which:

Figure 1, is a side elevation of my invention illustrating parts thereof in section, the same also being shown in conjunction with an article to be mended, Fig. 2, is a plan view of the device when in the position shown in full lines in Fig. 1, Fig. 3, is a longitudinal vertical sectional view of a rivet element or plug, Fig. 4, is a plan view of a fusible washer detached from the plug, Fig. 5 is a sectional view of a member designed for use in conjunction with my invention.

Referring now more particularly to the accompanying drawings wherein is illustrated the preferred embodiment of my invention, the numeral 10 designates a section of a portion of a pan bottom in conjunction with which my invention has been illustrated. While the device is shown in correlation with an article of this nature, it is to be recognized that it may be used for other purposes if so desired.

My invention consists more essentially in the provision of a rivet element including a shank portion 11, having a head 12 at one extremity, the latter designed to engage the article to be mended as illustrated. The rivet element is preferably constructed of a fire resisting material such for instance as copper and aluminum and of such construction that the parts thereof may be cast integral. The upper end of the shank portion 11 is bifurcated consequently forming prongs 13 which terminate in reduced ends 14 as shown. The outer peripheries of the prongs are in flush alinement with that of the shank element 11, however, the inner faces are beveled, consequently forming slanting faces 15 as illustrated. By reducing the prongs as shown in Fig. 1, it will be recognized that the bending thereof will be facilitated to a material extent.

My invention further consists of a washer 16 preferably formed of a fusible material such for instance as solder, however, it is to be recognized that the solder is fusible at a higher temperature than that normally encountered in cooking and boiling foods. The solder washer mentioned is provided with corresponding openings 17, one face 18 of each opening being formed slanting in order to conform with the degree of bevel of the inner face of the arms 13. The function performed by the correlative faces of the arms and washer will be readily recognized. In view of the fact that the washer is constructed of fusible material, it is apparent that the same after being first heated to a high degree will soften and secure a more firm grip about the shank than would ordinarily be the case.

In the operation of my invention, the shank 11 is first disposed through the hole in the article to be mended, after which the prongs are projected through the slots 17, the washer 16 assuming the position illustrated in Fig. 1. In consistence with the above, I have provided an element for effecting the bending and consequent clenching of the tongue elements 14 without the use of clumsy or heavy tools which are now employed. The element consists of a shank portion 17' carrying a head portion 20 at one extremity, the outer face of the latter being comparatively smooth and level in order that the device may be utilized for other purposes, which will be presently mentioned. The other extremity of the shank 11 is beveled as at 21 thus providing suitable cam faces which engage the inner sides of the tongue elements and effect the bending thereof when pressure is exerted upon the head portion such as is apparent.

After the prongs are bent into the position shown in dotted lines, in Fig. 1, the solder element is heated to a sufficiently high temperature whereby the same will melt and upon application of the head portion 20 of the fastening element, the prongs may be forced within the washer consequently providing a smooth upper face on the latter.

When using the washer 16 in this manner, the end surface of the same is preferably coated with rosin or a flux of similar nature in order that a secure grip may be obtained on the bottom of the engaging element and a water tight joint will result.

Such changes as are permissible by the sub-joined claims may be resorted to without departing from the spirit of my invention.

Having thus fully described my invention, what I claim as new and desire to secure by Letters Patent is:—

1. As an article of manufacture, a device for closing punctures or openings in sheet metal articles comprising a plug having a shank for projection through the opening and a head abutting the article about the opening, said shank being cylindrical and being bifurcated at a crotch point not within the article to form spaced prongs, the outer faces of the prongs being circular and the inner faces being flat and said prongs being reduced in cross section lengthwise along their inner flat faces from the bifurcated crotch toward their ends, the cylindrical portions of the prongs being tapered convergingly toward their ends thereby providing prongs having relatively extensive surface areas near the bifurcated crotch and being materially weakened near their ends, and a washer of fusible material having spaced openings to receive said prongs with the openings provided with semi-circular outer portions and longitudinally inclined flat inner portions, the weakened ends of said prongs being adapted to be bent or clenched upon and depressed into the washer when the same is heated, substantially as described.

2. As an article of manufacture, a device for closing punctures or openings in sheet metal articles comprising a plug having a shank for projection through the opening and a head abutting the article about and closing the opening, said shank being bifurcated to form spaced prongs and the prongs being tapered toward their ends to weaken the end portions thereof with respect to the base portions, and a washer of fusible material having openings shaped to conform to the cross section of said prongs and adapted to be disposed thereabout and against the article to be repaired, said prongs being adapted to be bent or clenched upon said fusible washer, substantially as described.

3. As an article of manufacture, a device for closing punctures or openings in sheet metal articles comprising a plug having a shank adapted for projection through the opening and a head for abutting the article about such opening, said shank being bifurcated to divide the same into prongs and the crotch of the bifurcation being disposed substantially flush with the inner face of the article to be repaired, and a washer of fusible material having spaced openings for projection therethrough of the prongs and having a central portion seated in the crotch or base of the bifurcated shank, the ends of said prongs being adapted to be bent or clenched upon and depressed into the fusible washer when the same is heated, substantially as described.

In testimony whereof I affix my signature in presence of two witnesses.

IVES D. LOUNSBURY.

Witnesses:
JOHN F. GIBBONS,
JOHN P. BUCKLEY.